United States Patent [19]

Schimmeyer

[11] Patent Number: 4,770,160

[45] Date of Patent: Sep. 13, 1988

[54] VENT DAMPER

[76] Inventor: Werner K. Schimmeyer, 8937 Acorn Pl., Santa Rosa, Calif. 95405

[21] Appl. No.: 868,767

[22] Filed: May 29, 1986

[51] Int. Cl.$^4$ .............................................. F16K 24/04
[52] U.S. Cl. ................... 126/285 A; 110/163; 126/294; 126/307 A; 126/350 R; 137/513.3; 137/533.27
[58] Field of Search ............... 98/79, 119; 110/163; 126/285 A, 294, 307 A, 350 R; 137/513.3, 533.27; 236/45

[56] References Cited

U.S. PATENT DOCUMENTS

| | | | |
|---|---|---|---|
| 167,868 | 9/1875 | Baily | 236/45 |
| 232,459 | 9/1880 | Collinge | 126/294 |
| 733,404 | 7/1903 | La Veine | 126/294 |
| 987,946 | 3/1911 | Bergler | 137/513.3 |
| 1,897,076 | 2/1933 | Shand | 137/533.27 |
| 1,949,026 | 2/1934 | Nitka | 126/307 A |
| 1,974,567 | 9/1934 | Gerlach | 236/45 |
| 2,473,804 | 6/1949 | Ledoux | 236/45 |
| 2,660,998 | 12/1953 | James et al. | 126/307 A |
| 3,401,624 | 9/1968 | Mohrman | 98/119 X |
| 4,259,943 | 4/1981 | Rodrigue | 110/163 X |
| 4,526,160 | 7/1985 | Ickes | 126/307 R |

FOREIGN PATENT DOCUMENTS 1261991 4/1961 France ........................... 126/307 A Primary Examiner—Harold Joyce
Attorney, Agent, or Firm—Rosenblum, Parish & Bacigalupi

[57] ABSTRACT

An improved vent damper for oil or natural gas-fired hot water heaters includes a damper assembly incorporated into the exhaust duct above a hot water heater, and contains a lightweight, floating poppet closure slidably mounted on a reduced-diameter exhaust pipe. When the hot water heater's main burner is operating, hot exhaust gasses lift the floating poppet closure, and the gasses escape through the gap thereby created around its base. These exhaust gasses are then vented to the outside air via an exhaust duct. When the main burner is turned off again, the floating poppet closure falls back again to its original (closed) position, thereby blocking the exhaust duct and preventing cool room air from circulating through the heater and its central core. Pilot light exhaust gasses are able to continuously escape through the reduced-diameter exhaust pipe even when the floating poppet closure is in the closed position. A cover is mounted on the reduced-diameter exhaust pipe above the floating poppet closure, protecting the poppet from damage and acting as a stop to limit its upward travel.

9 Claims, 1 Drawing Sheet

VENT DAMPER

BACKGROUND OF THE INVENTION

1. Field of the Invention

This invention relates generally to heating and ventilation equipment, and more specifically to vent dampers and flue closures for oil or gas-fired hot water heaters.

2. Description of the Prior Art

Many modern hot water heaters are designed to burn oil or natural gas to generate their heat energy. In these systems, the fuel is burned in a combustion chamber located in or near the base of the heater, and the water contained in the heater is conductively heated through the walls of the heater both by contact with the fire of the combustion itself, as well as by contact with the hot combustion gasses rising through the heater's central core. Because these combustion gasses are toxic, they must be vented to the outside air by means of an exhaust duct or flue.

Energy losses through such exhaust ducts can be significant; it is estimated that approximately 33% of the heat energy generated from the main burner and pilot light operation is lost directly up the flue. In addition, an unrestricted duct allows cool room air to circulate freely through the hot water heater and its central core, thereby cooling the heated water and requiring the main burner to operate more frequently than would otherwise be necessary. Thus, it is clearly desirable, for efficiency and cost considerations, to regulate the flow of gasses both in and out of a gas-fired hot water heater.

Numerous damping devices have been developed for use with boilers, furnaces, and other cumbustion gas-producing systems. Many are simply hinged, one-way mechanical valves that prevent outside air from coming down the exhaust duct. While effective for that purpose, such devices often require significant exhaust flow in order to open, and thus are useable only with relatively large units, or those equipped with a fan or blower. Some large commercial water heaters may include power-assisted or computer-controlled mechanical dampers. Unfortunately, such systems are too costly and cumbersome for widespread domestic use. Still other damping devices utilize bimetal expansion/contraction valves to regulate flow. However, these devices tend to respond slowly to temperature and flow changes.

SUMMARY OF THE INVENTION

The present invention provides an improved vent damper for oil or natural gas-fired hot water heaters. The invention includes a damper assembly incorporated into the exhaust duct above a hot water heater, and contains a lightweight, floating poppet closure slidably mounted on a reduced-diameter exhaust pipe. When the hot water heater's main burner is operating, hot exhaust gasses lift the floating poppet closure, and the gasses escape through the gap thereby created around its base. These exhaust gasses are then directed to the outside air via the exhaust duct. When the main burner is turned off again, the floating poppet closure falls back again to its original (closed) position, thereby blocking the exhaust duct and preventing cool room air from circulating through the heater and its central core. Pilot light exhaust gasses are able to continuously escape through the reduced-diameter exhaust pipe even when the floating poppet closure is in the closed position. A cover is mounted on the reduced-diameter exhaust pipe above the floating poppet closure, protecting the poppet from damage and acting as a stop to limit its upward travel.

In the preferred embodiment of this invention, the floating poppet closure is conically-shaped, with a flat base and sloped sides, and is nestable beneath a similarly conically-shaped cover when the poppet is in the raised (open) position. A beneficial feature of this arrangement is that a strong downdraft of outside air through the exhaust duct and thus directed over the conical cover will create a mild vacuum beneath the cover and over the floating poppet closure, causing the poppet to rise (open) irrespective of main burner operation. This effect insures that even in a severe downdraft of outside air, main burner exhaust gasses will still be able to escape from the heater. The conical cover also helps prevent a downdraft from extinguishing the pilot light.

BRIEF DESCRIPTION OF THE DRAWINGS

FIG. 2a is a view of the vent damper in its closed position;

FIG. 2b is a view of the vent damper in its open position; and

FIG. 2c is a view of the vent damper while opening during a downdraft situation.

DETAILED DESCRIPTION OF A PREFERRED EMBODIMENT

Figure 1:
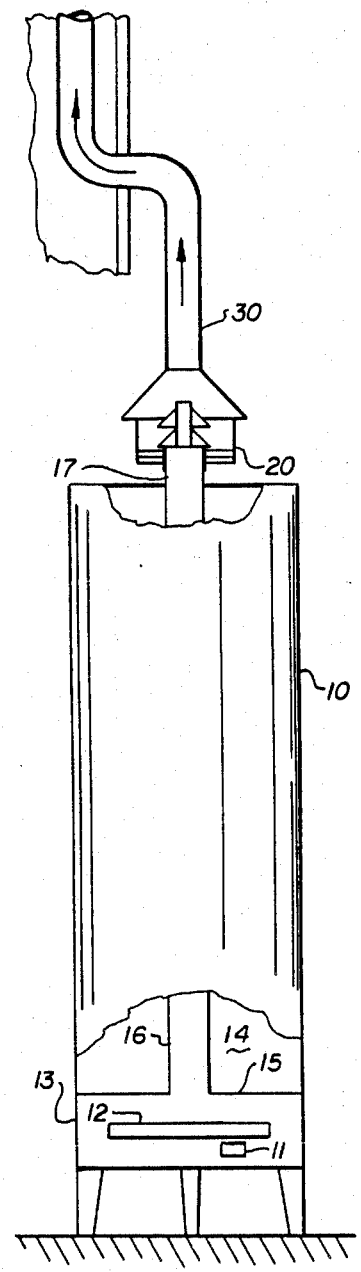
FIG. 1 is a partially cutaway elevated side view of a gas-fired hot water heater system incorporating the vent damper of this invention.

FIG. 1 shows a partially cutaway elevated side view of a typical gas-fired hot water heater 10 in operation with a vent damper 20 of this invention incorporated into an exhaust duct 30. The heater 10 includes a pilot light 11 and a main burner 12 contained within a combustion chamber 13. Burning of the natural gas fuel in the combustion chamber heats a quantity of water contained in a tank 14 in two ways: (1) by conduction directly from the burning gas through a base 15 of the tank, and (2) by conduction from the hot, rising exhaust gasses through a central core 16 of the heater. The exhaust gasses exit the top of the heater at a port 17, flow through the vent damper 20, and into and through the exhaust duct 30 to be exhausted to the outside air.

Figure 2A:
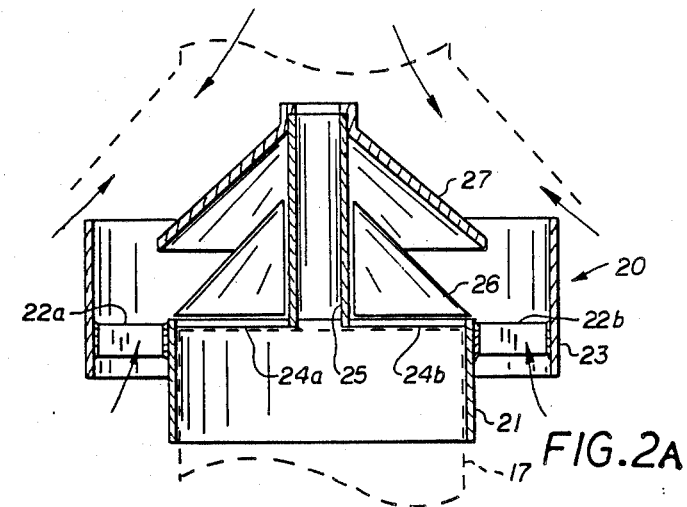
FIGS. 2a–c are cutaway elevated side views of the vent damper of this invention in operation.
Figure 2B:
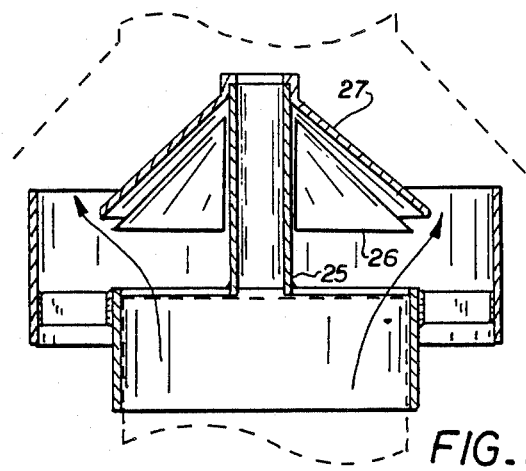
Figure 2C:
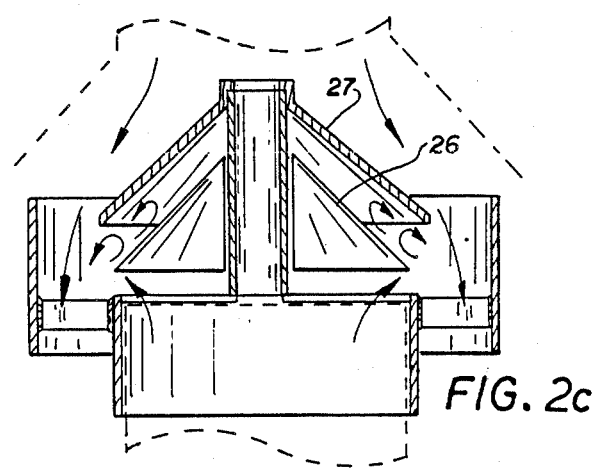

Referring now to FIGS. 2a–c with greater particularity, the vent damper 20 is shown in cutaway elevated side views. FIG. 2a shows the damper in its closed (main burner off) configuration. Damper 20 includes base tube 21, of a size for secure attachment and connection to the water heater port 17. A pluarality of arms 22a, b, etc. extend radially outward from the base tube to a larger diameter deflector tube 23. A plurality of inside support legs 24a, b, etc. extend radially inwards from the base tube to a reduced-diameter pilot light exhaust pipe 25, which extends upwardly from the plane of the legs. Thus, in this arrangement, deflector tube 23, base tube 21, and exhaust pipe 25 are coaxial tube segments of progressively smaller diameter.

A floating poppet closure 26 is slidably mounted on the reduced diameter exhaust pipe 25, and, when the water heater main burner is off, rests on the assembly formed by inside support legs 24a, b, etc. Poppet closure 26 is preferably a conically shaped (flat base with sloping sides) piece with a central, tubular hollow along its vertical axis. It is constructed of extremely light, yet rigid and heat-resistant material, such as aluminum foil. The conical shape is desirable for two reasons: (1) such a shape tends to be inherently stronger than merely a flat piece, especially with the lightweight materials used here; and (2) this shape tends to shed, rather than accumulate, any debris that might fall on the poppet, which debris could weigh down the poppet and affect its movement.

FIG. 2b shows the damper in its open (main burner on) configuration. When the water heater main burner is on, and hot combustion gasses are rising through the heater's central core, the rising gasses lift poppet closure 26 to its open position. These hot combustion gasses are then free to flow around poppet closure 26, and are deflected up into the entrance of exhaust duct 30 by deflector tube 23.

Thus, the exhaust pipe 25 acts both as the permanent exhaust feature for pilot light exhaust gasses, as well as a "guide" for the vertical sliding of the poppet closure 26. The central, tubular hollow of the poppet closure provides a large contact area with the outside surface of the exhaust pipe. This is desirable in that the poppet closure is expected to go through thousands of closed-/open cycles in its useful lifetime, and a small contact area might wear too much and hinder the smooth movement of the sliding poppet. However, the materials used to construct the poppet closure and exhaust pipe must have a relatively low coefficient of friction with each other, to allow easy movement.

A conical cover 27 is secured to the top of exhaust pipe 25 and is shaped to be able to nest with the floating poppet closure 26 when the poppet closure is in its open (up) position. Cover 27 is made of a stronger guage material than the poppet closure, so that it acts as a shield to protect the relatively fragile material of the poppet closure from debris or puncture. The conical, nesting shape of cover 27 results in a further desirable feature of this invention: as is illustrated in FIG. 2c, a downdraft through the exhaust duct will be deflected around the cover, creating a mild vacuum on its lee (under) side. This vacuum is sufficient to lift the lightweight poppet closure to its open position. Such an effect is desirable in that it ensures that even in a downdraft situation, which would close most ordinary dampers, the combustion gasses will be able to escape from the heater.

While this invention has been described in connection with preferred embodiments thereof, it is obvious that modifications and changes therein may be made by those skilled in the art to which it pertains without departing from the spirit and scope of the invention. For example, an electronically-ignited gas-fired hot water heater does not require a continuously-burning pilot light, so there is no necessity to include the permanent exhaust capacity of the reduced-diameter pilot light exhaust pipe described in the preferred embodiment. In such an application, a simple, nonhollow shaft could replace the exhaust pipe, and still provide the appropriate "guide" feature of the pipe. Furthermore, a simplified poppet closure can be designed avoiding the conical shape, and using only a basal portion and some form of guide means to provide the appropriate alignment (however, such a simplified version would not tend to be as strong, nor be as able to shed debris, as would the conical shape). Accordingly, the scope of this invention is to be limited only by the appended claims.

What is claimed as invention is:

1. A vent damper for limiting the flow of ambient air in a hot water heater having a main burner, a pilot light burner, and an exhaust port for evacuation of exhaust gases from said main burner and said pilot light burner, comprising:
   attachment means for connection to said exhaust port;
   moveable poppet means for controlling the flow of ambient air through said exhaust port and including a generally conically shaped member with a central, tubular hollow along its vertical axis, said poppet means being moveable between at least an upward first position and a downward second position;
   assembly means for supporting said poppet means; and
   guide means for aligning said poppet means above said assembly means and including pilot exhaust means for allowing said pilot exhaust gasses to flow through said exhaust port even when said poppet is in said second position, wherein when said main burner is operating, said exhaust gases move said poppet means upward toward said first position to permit said exhaust gases to flow through said exhaust port, and when said main burner is not operating, said poppet means returns downward to said second position to prevent said ambient air from flowing through said exhaust port.

2. The vent damper of claim 1 wherein said movable poppet means comprises a generally conically-shaped member with a central, tubular hollow along its vertical axis, said hollow being conditioned to slidably engage said guide means.

3. The vent damper of claim 2 including stop means for limiting the upward movement of said poppet to said first position.

4. The vent damper of claim 3 wherein said stop means comprises shield means for deflecting an exhaust port downdraft away from said poppet, urging said poppet into said first position, and protecting said poppet from debris.

5. The vent damper of claim 4 wherein said cover means is shaped to nest with said poppet when said poppet is in said first position.

6. A vent damper for a hot water heater having a main burner, an exhaust port for evacuation of the exhaust gases generated by said main burner, a pilot burner light or other burner starting means, and an exhaust duct attached to said exhaust port for venting said exhaust gases, said vent damper comprising:
   poppet means which is generally conically shaped and disposed between said exhaust duct and said exhaust port for controlling the flow of gasses through said exhaust port, said poppet means having means for mating with a guide means and being movable between an upward first position providing a predetermined maximum flow opening coupling said exhaust port and said exhaust duct, and a downward second position providing a predetermined minimum flow opening coupling said exhaust port and said exhaust duct, said minimum flow opening being small enough to substantially limit the flow of ambient gases but large enough to allow passage of gases from said pilot light or other burner starting means;
   guide means disposed coaxial with said exhaust port and operative to align said poppet means therewith and to guide said poppet means as it is moved between said first position and said second position; and shield means disposed above said poppet means and configured to nest therewith when said poppet means is in said first position, said shield means being supported by said guide means and serving to deflect exhaust duct downdrafts away from said poppet means, whereby when said main burner is operating, the exhaust gas moves said poppet means upward toward said first position to permit said exhaust gases to flow through said exhaust port and around said poppet means to said exhaust duct, and when said main burner is not operating, said poppet means returns downward to said second position to limit the flow of ambient and pilot burner gases from said exhaust port into said exhaust duct.

7. A vent damper as recited in claim 6 wherein said guide means includes an elongated cylindrical member disposed coaxial with said exhaust port; and wherein said poppet means includes a generally conically shaped member having an opening formed in the apex portion thereof for receiving and slidably mating with said guide means.

8. A vent damper as recited in claim 7 wherein said cylindrical member includes a bore passing longitudinally therethrough.

9. A vent damper as recited in claim 7 and further including means for limiting the travel of said poppet means to define said upward first position and said downward second position.

* * * * *